(12) United States Patent
Stenger

(10) Patent No.: US 10,821,826 B2
(45) Date of Patent: Nov. 3, 2020

(54) FRONT END PART OF A MOTOR VEHICLE

(71) Applicant: Dr. Ing. h.c. F. Porsche Aktiengesellschaft, Stuttgart (DE)

(72) Inventor: Reinhard Stenger, Leonberg (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 496 days.

(21) Appl. No.: 15/006,179

(22) Filed: Jan. 26, 2016

(65) Prior Publication Data

US 2016/0214464 A1 Jul. 28, 2016

(30) Foreign Application Priority Data

Jan. 28, 2015 (DE) .......................... 10 2015 101 213

(51) Int. Cl.
B60K 11/08 (2006.01)

(52) U.S. Cl.
CPC ............. B60K 11/085 (2013.01); *Y02T 10/88* (2013.01)

(58) Field of Classification Search
CPC ............................. B60K 11/085; Y02T 10/88
USPC ......................................... 454/143, 145, 151
See application file for complete search history.

(56) References Cited

U.S. PATENT DOCUMENTS

| | | | | |
|---|---|---|---|---|
| 8,118,124 B2 * | 2/2012 | Shin | .......................... | F01P 7/12 180/68.1 |
| 9,333,850 B2 * | 5/2016 | Ruppert | .................. | B60R 19/52 |
| 9,902,256 B2 * | 2/2018 | Yamamoto | ........... | B60K 11/085 |
| 2010/0282438 A1 | 11/2010 | Wirth et al. | | |
| 2011/0203861 A1 | 8/2011 | Charnesky et al. | | |
| 2013/0103265 A1 * | 4/2013 | Remy | .................. | B60K 11/085 701/49 |
| 2014/0232145 A1 | 8/2014 | Lanard et al. | | |
| 2014/0346809 A1 * | 11/2014 | Lee | ..................... | B60K 11/085 296/180.5 |

FOREIGN PATENT DOCUMENTS

DE   10 2009 020 352   11/2010
DE   10 2011 011 035    2/2012
(Continued)

OTHER PUBLICATIONS

German Search Report dated Dec. 9, 2015.
French Search Report dated Feb. 28, 2019.

*Primary Examiner* — Edelmira Bosques
*Assistant Examiner* — Dana K Tighe
(74) *Attorney, Agent, or Firm* — Gerald E. Hespos; Michael J. Porco; Matthew T. Hespos

(57) ABSTRACT

A front end part (10) of a motor vehicle has cooling air openings (11) arranged next to one another and separated by webs (12). Flaps (13) are arranged next to one another and are assigned to the cooling air openings (11). The flaps (13) can be displaced between a first position in which the flaps (13) prevent a cooling airflow through the cooling air openings (11), and a second position in which the flaps (13) enable a cooling airflow through the cooling air openings (11). Reinforcing ribs (18) extend in the region of the webs (12) on an inwardly directed side thereof. The flaps (13) are mounted rotatably on the reinforcing ribs (18) so that corresponding bearing points of the flaps (13) on the reinforcing ribs (18) lie outside the cooling air openings (11) and thus outside the cooling airflow when the flaps (13) are in the second position.

5 Claims, 2 Drawing Sheets

(56) References Cited

FOREIGN PATENT DOCUMENTS

| | | |
|---|---|---|
| DE | 10 2012 000 173 | 7/2013 |
| EP | 2 457 761 | 5/2012 |
| FR | 2825326 | 12/2002 |
| FR | 2860575 | 4/2005 |

* cited by examiner

FRONT END PART OF A MOTOR VEHICLE

CROSS REFERENCE TO RELATED APPLICATION

This application claims priority under 35 USC 119 to German Patent Appl. No. 10 2015 101 213.8 filed on Jan. 28, 2015, the entire disclosure of which is incorporated herein by reference.

BACKGROUND

1. Field of the Invention

The invention relates to a front end part of a motor vehicle.

2. Description of the Related Art

EP 2 457 761 B1 discloses a device for regulating an airflow through cooling air openings of a front end part of a motor vehicle. The device has at least one flap that can be displaced between first and second positions. The flap has a generally curved shape and closes the respective cooling air opening in the first position. The flap has a generally planar shape and opens the cooling air opening in the second position. The respective flap can be displaced about an axis through an upper end when being displaced between the first and the second position.

DE 10 2011 011 035 B4 discloses a front end part of a motor vehicle with a grille having plural cooling air openings and an airflow control device. The airflow control device is displaceable along a semicircular path to open or close the cooling air openings.

There is a requirement for a front end part of a motor vehicle that allows a sufficiently high or large cooling airflow in combination with a low drag coefficient. The object of the invention is to provide such a front end part of a motor vehicle.

SUMMARY

The front end part according to the invention has cooling air openings arranged next to one another and separated from one another by webs. Flaps are arranged next to one another and are assigned to the cooling air openings. The flaps can be displaced between a first position in which the flaps prevent a cooling airflow through the cooling air openings, and a second position in which the flaps enable a cooling airflow through the cooling air openings. Reinforcing ribs extend in the region of the webs on an inward side thereof. The flaps are mounted rotatably on the reinforcing ribs in such a way that corresponding bearing points of the flaps on the reinforcing ribs lie outside the cooling air openings and thus outside the cooling airflow when the flaps are displaced into the second position. The front end part makes it possible to ensure a low drag coefficient and to provide a sufficiently high cooling airflow.

Plural flaps can be displaced jointly between the first position and the second position about a common axis of rotation that extends through bearing points of the flaps and runs substantially parallel to the lower end of the flaps. A front end of each flap is pivoted up in the first position, and the front end of each flap is pivoted down in the second position. This configuration of the invention is particularly advantageous. To open the cooling air openings, the flaps are pivoted about the common axis of rotation so that the front ends of the flaps are pivoted from the top down. As a result, the front ends of the flaps are situated at the front as viewed in the direction of travel. It is thereby possible to ensure a particularly effective airflow guidance through the cooling air openings.

A lip may be formed on the front end of each flap. The lip reinforces the respective flap in the first position and serves for cooling airflow guidance in the second position. The lip on the front end of each flap serves as a cooling air collector when the cooling air openings are opened and has the effect that cooling air can flow particularly effectively through the cooling air openings. The lips reinforce the flaps to retain the flaps in a defined manner in the closed state.

The flaps arranged next to one another may be connected to one another at the lower end by projections. The axis of rotation of the flaps may extend through these projections. The flaps may be clipped directly by the projections into recesses of the reinforcing ribs. Accordingly, a retaining frame for the flaps can be dispensed with. As a result, a particularly simple design of the front end part is ensured.

Exemplary embodiments of the invention will be explained in more detail with reference to the drawings, without being restricted thereto.

DETAILED DESCRIPTION

Figure 1:
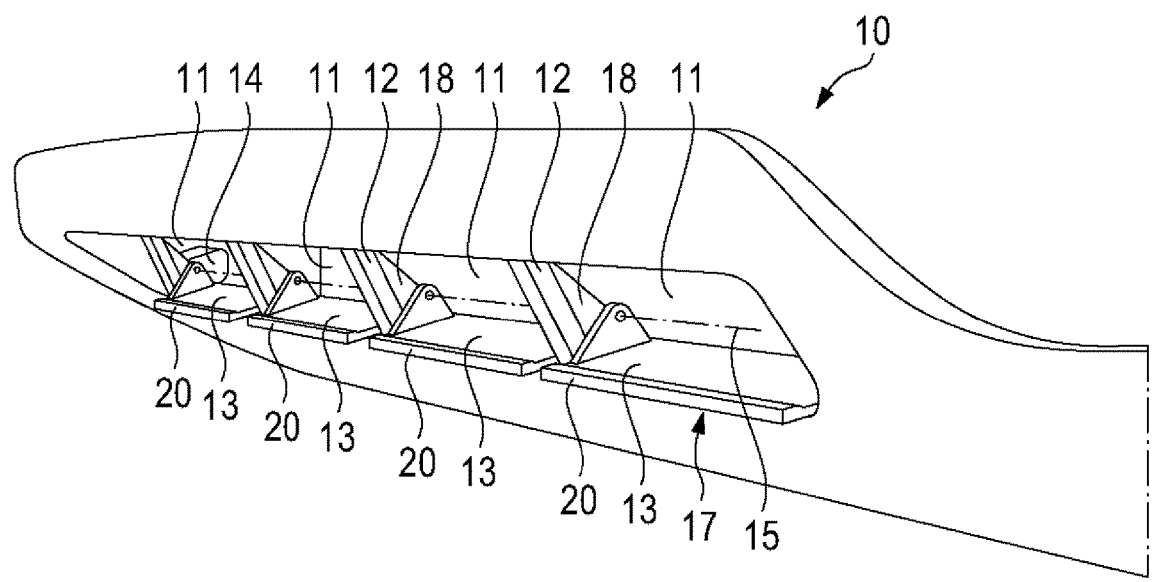
FIG. 1 is a front perspective view of a motor vehicle front end part according to the invention with opened cooling air openings.

The invention relates to a front end part of a motor vehicle, in particular a front end part for a high-performance vehicle, such as a sports car.

In the case of high-performance vehicles there is typically a conflict of aims between a low drag coefficient, also denoted as cW value, and a required throughput of cooling airflow through cooling air openings of the front end part. The invention proposes a front end part whereby this conflict of aims can be resolved. Thus, on the one hand, a low drag coefficient can be provided, and, on the other hand, a sufficiently high or large cooling airflow through the cooling air openings can be ensured.

The front end part 10 has cooling air openings 11 that are positioned next to one another in at least one row. The row of the cooling air openings 11 extends in the transverse direction of the motor vehicle.

The cooling air openings 11 positioned next to one another are separated from one another by webs 12 of the front end part 10.

The front end part 10 further has flaps 13 assigned to the cooling air openings 11 arranged next to one another. Thus, the flaps 13 also are positioned next to one another.

Each cooling air opening 11 is assigned a flap 13, and the flaps 13 can be displaced by a motor 14 between first and second positions. In the first position, the flaps 13 prevent a cooling airflow through the cooling air openings 11, whereas, in the second position, the flaps 13 enable a cooling airflow through the cooling air openings 11.

Figure 3:
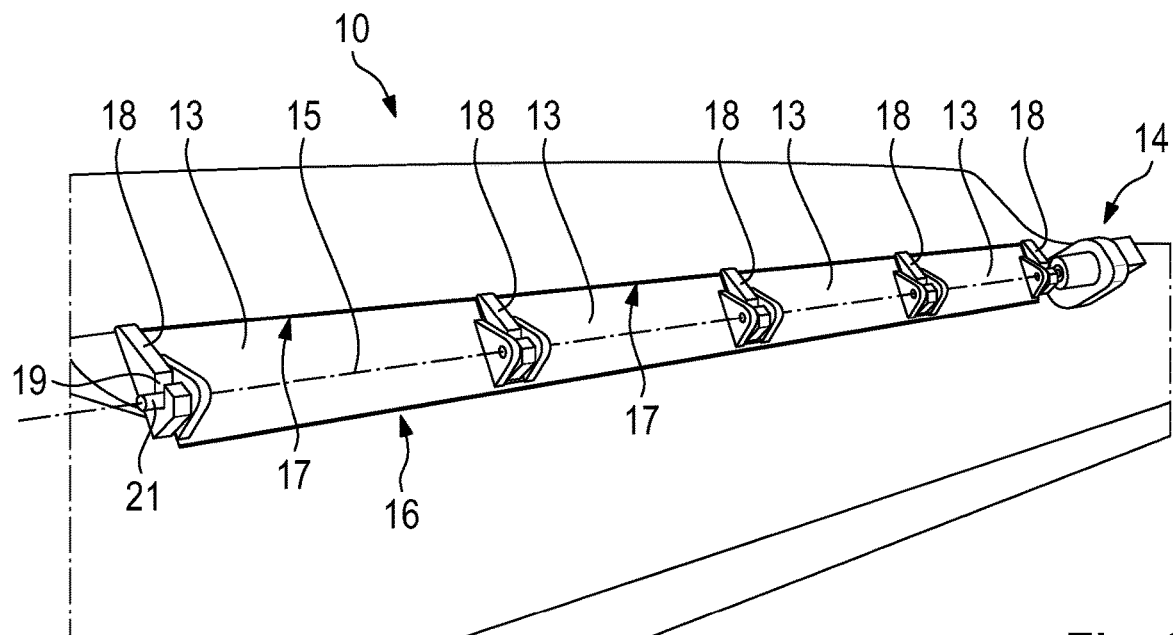
FIG. 3 is a perspective detail view from the rear of the front end part with closed cooling air openings.
Figure 4:
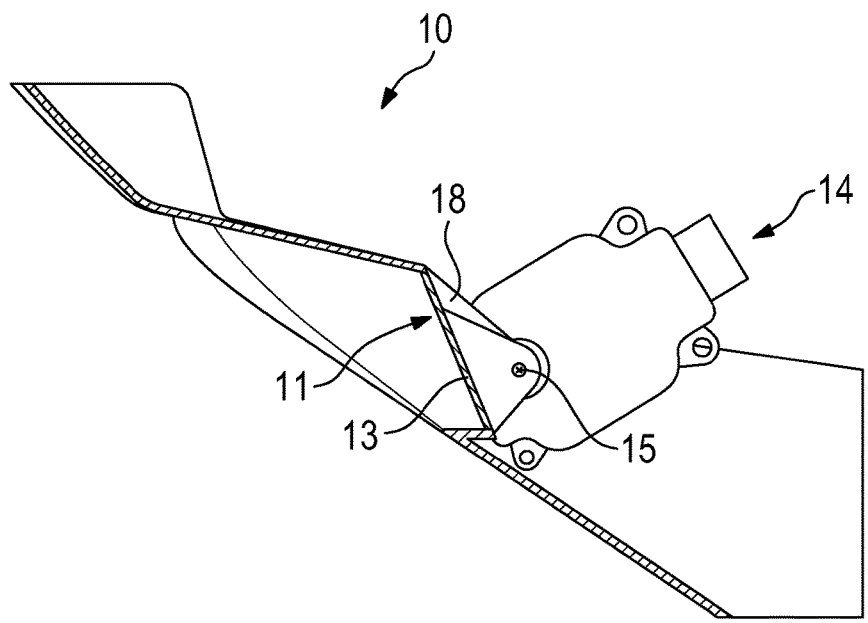
FIG. 4 is a side view of the front end part with closed cooling air openings.

The cooling air openings 11 and flaps 13 shown in FIGS. 1 and 3 are arranged on the left side of the longitudinal center axis as viewed from the front opposite to the direction of travel. An identical number of cooling air openings 11 with flaps 13 are present on the opposite side of the longitudinal center axis.

In each case, the flaps 13 positioned to one side of the longitudinal center axis can be displaced jointly between the first position and the second position about a common axis of rotation 15. The respective axis of rotation 15 of the flaps 13 preferably extends through a rear and lower end 16 of the respective flaps 13. The flaps 13 can be displaced about the respective axis of rotation 15 in such a way that a front end 17 of the respective flaps 13 is pivoted up in the first position and the front end 17 of the respective flaps 13 is pivoted down in the second position.

Reinforcing ribs 18 are formed on inwardly directed sides of the webs 12 that separate the adjacent cooling air openings 11 from one another. The flaps 13 are rotatably mounted on the reinforcing ribs 18 so that corresponding bearing points of the flaps 13 on the reinforcing ribs 18 lie outside the cooling air openings 11 and thus outside the cooling airflow when the flaps 13 are displaced into the second position. Thus, it is ensured that cooling air can flow advantageously through the cooling air openings when the flaps 13 are displaced into the second position.

A lip 20 is formed on the front end 17 of each flap 13. Each lip 20 reinforces the respective flap 13 to keep the flap 13 closed in a defined manner in the first position. Then, the respective lip 20 functions as a cooling air collector and as an element for cooling airflow guidance to further improve the flow of cooling air through the respective cooling air opening 11 when the flap 13 is transferred into the second position and opens up the respective cooling air opening 11.

Figure 2:
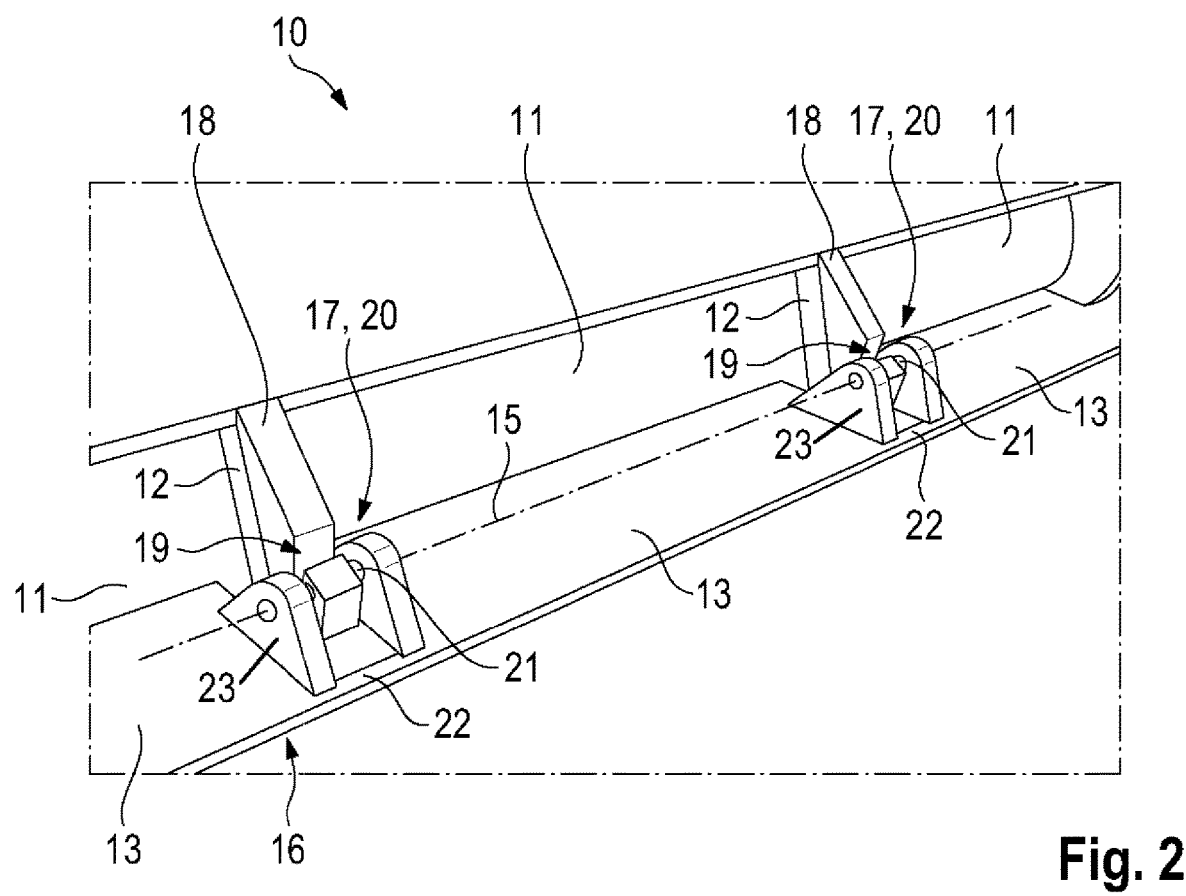
FIG. 2 is a perspective view from the rear of the front end part with opened cooling air openings.

As can best be seen from FIG. 2, the flaps 13 arranged next to one another are connected to one another at the lower or rear end 16 by pivot pins 21 and projections 23 connected to opposite ends of the pivot pins 21. The axis of rotation 15 of the flaps 13 extends through these pivot pins 21 and parts of the projections 23 to which the pivot pins 21 are mounted. The flaps 13 preferably are clipped directly by the pivot pins 21 into corresponding recesses 19 of the reinforcing ribs 18. It is possible in this way for the flaps 13 to be fastened simply to the front end part 10 without additional retaining frames.

The front end part 10 has plural cooling air openings 11 positioned next to one another and separated from one another by webs 12. Interacting with each cooling air opening 11 is a respective flap 13 by means of which the cooling airflow through the respective cooling air opening 11 can be blocked or enabled.

In the region of the webs 12 that separate the cooling air openings 11 from one another, reinforcing ribs 18 extend on an inwardly directed side thereof. The reinforcing ribs improve the stiffness of the webs 12 in terms of deflection and twisting or torsion during an actuation or displacement of the flap 13 and having the bearing points for the flaps 13 formed thereon. The bearing points for the flaps 13 are positioned outside the opening cross sections of the cooling air openings 11. As a result, the airflow through the cooling air openings 11 when the flaps 13 are opened is possible without hindrance.

The air guidance or airflow through the cooling air openings 11 when the flaps 13 are opened is further improved by the lips 20 in the region of the front ends 17 of the flaps 13. The lips 20 reinforce the flaps with respect to the air forces that occur with the flaps 13 in the closed state.

When the flaps 13 are opened, the front ends 17 of the flaps 13 are lowered and are at the front in the direction of travel. As a result, the lips 20 effectively collect the cooling airflow and channel it in the direction of the cooling air openings 11.

The flaps 13 are clipped directly into corresponding recesses 19 of the reinforcing ribs 18 by means of the pivot pins 21 so that the flaps 13 positioned next to one another can be connected to one another. Thus, a retaining frame for the flaps 13 can be dispensed with. Further projections 22 are formed on the rear and lower end 16 of the flaps 13. The further projections 22 are parallel to the pivot pins 21 that connect the flaps 13 positioned next to one another and serve to connect flaps 13 positioned next to one another at the rear and lower end 16 thereof.

The flaps 13 positioned to each side of a longitudinal center axis can be displaced by a common servo motor 14 jointly between the first position and the second position. The servo motor 14 is positioned laterally next to the respective flaps 13. In this case, the respective servo motor 14 can be located directly on the axis of rotation 15 and displaces the flaps 13. Alternatively, it is also conceivable that the respective servo motor 14 does not lie on the axis of rotation 15, but rather transmits the rotary movement to the flaps 13 by means of levers or arms. Furthermore, it is also possible to use a servo motor formed as a linear drive for actuating the flaps 13.

What is claimed is:

1. A front end part of a motor vehicle, comprising:
a plurality of laterally spaced webs defining cooling air openings between the webs;
reinforcing ribs extending respectively on an inward side of the respective webs, each of the reinforcing ribs having an upwardly open recess at a position between front and rear ends of the respective reinforcing rib, each of the upwardly open recesses forming a bearing point at a position outside of the respective cooling air opening;
flaps arranged next to one another and assigned respectively to the cooling air openings so that each of the flaps extends between two of the reinforcing ribs;
projections projecting from opposite ends of each of the flaps and projecting from an inward side of each of the flaps, each of the projections having a surface facing toward a corresponding one of the reinforcing ribs; and
pivot pins pivotally mounted respectively in the upwardly open recesses of the reinforcing ribs, each of the pivot pins having opposite ends mounted to extend respectively from the surfaces of the projections that face the respective reinforcing ribs, the pivot pins defining a common axis of rotation, the flaps that are arranged next to one another being connected axially to one another by the pivot pins so that the flaps are displaceable between a first position in which the flaps prevent a cooling airflow through the cooling air openings, and a second position in which the flaps enable the cooling airflow through the cooling air openings; and
a motor positioned on one side laterally next to the flaps that are arranged next to one another, the motor rotatably displacing the flap adjacent thereto and thereby rotating all of the flaps jointly about the common axis of rotation defined by the projections.

2. The front end part of claim 1, wherein the common axis of rotation that extends through the bearing points of the flaps runs substantially parallel to lower ends of the flaps so that, in the first position, a front end of each flap is pivoted up and, in the second position, the front end of each of the flaps is pivoted down.

3. The front end part of claim 2, further comprising a lip formed on the front end of each of the flaps, the lips reinforcing the respective flaps in the first position and being configured for guiding the cooling airflow through the respective cooling air opening in the second position.

4. The front end part of claim 3, wherein the axis of rotation extends through the projections.

5. The front end part of claim 3, wherein the flaps are clipped directly by the pivot pins into the upwardly open recesses of the reinforcing ribs.

\* \* \* \* \*